United States Patent

Sekine (10) Patent No.: US 10,367,183 B2
(45) Date of Patent: Jul. 30, 2019

(54) ASSEMBLED BATTERY

(71) Applicant: Hitachi Automotive Systems, Ltd., Hitachinaka-shi, Ibaraki (JP)

(72) Inventor: Atsushi Sekine, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 15/574,269

(22) PCT Filed: May 18, 2016

(86) PCT No.: PCT/JP2016/064670
§ 371 (c)(1),
(2) Date: Nov. 15, 2017

(87) PCT Pub. No.: WO2016/203891
PCT Pub. Date: Dec. 22, 2016

(65) Prior Publication Data
US 2018/0138483 A1    May 17, 2018

(30) Foreign Application Priority Data

Jun. 16, 2015 (JP) ................. 2015-120982

(51) Int. Cl.
*H01M 2/20* (2006.01)
*H01M 2/10* (2006.01)
(Continued)

(52) U.S. Cl.
CPC ............ *H01M 2/202* (2013.01); *H01M 2/10* (2013.01); *H01M 2/1016* (2013.01); *H01M 2/20* (2013.01);
(Continued)

(58) Field of Classification Search
None
See application file for complete search history.

(56) References Cited

U.S. PATENT DOCUMENTS

| 2010/0052692 A1 | 3/2010 | Yano et al. |
| 2010/0073005 A1 | 3/2010 | Yano et al. |
| 2011/0212348 A1* | 9/2011 | Yasui ................ H01M 2/1077 429/7 |

FOREIGN PATENT DOCUMENTS

| JP | 2008-204990 A | 9/2008 |
| JP | 2009-59663 A | 3/2009 |

(Continued)

OTHER PUBLICATIONS

International Search Report (PCT/ISA/210) issued in PCT Application. No. PCT/JP2016/064670 dated Aug. 9, 2016 with English translation (four (4) pages).

(Continued)

*Primary Examiner* — Eli S Mekhlin
(74) *Attorney, Agent, or Firm* — Crowell & Moring LLP (57) ABSTRACT

The objective is to obtain an assembled battery that can relieve the stress acting on the circuit board in the case. This assembled battery of the present invention includes a case for retaining a plurality of single batteries side by side, an insulation cover covering one surface side of the single batteries, bus bars electrically connecting the terminals of adjacent single batteries and exposed from the insulation cover, and a circuit board disposed above the insulation cover. Mounted on a back surface of the circuit board are elastic contact members to be brought into pressure contact with the bus bars by fixing the circuit board onto the case, and the insulation cover or the bus bars are provided with claws which are support members for supporting the circuit board by coming in contact with a front surface of the circuit board.

4 Claims, 10 Drawing Sheets

(51) Int. Cl.
*H01M 10/44* (2006.01)
*H01M 10/48* (2006.01)
*H01M 10/42* (2006.01)

(52) U.S. Cl.
CPC ......... *H01M 10/425* (2013.01); *H01M 10/44* (2013.01); *H01M 10/48* (2013.01); *H01M 10/482* (2013.01); *H01M 2010/4271* (2013.01)

(56) References Cited

FOREIGN PATENT DOCUMENTS

| | | |
|---|---|---|
| JP | 2009-289428 A | 12/2009 |
| JP | 2010-80135 A | 4/2010 |
| JP | 2014-13722 A | 1/2014 |
| JP | 2015-138604 A | 7/2015 |
| JP | 2016-18634 A | 2/2016 |

OTHER PUBLICATIONS

Japanese-language Written Opinion (PCT/ISA/237) issued in PCT Application No. PCT/JP2016/064670 dated Aug. 9, 2016 (three (3) pages).
Extended European Search Report issued in counterpart European Application No. 16811366.0 dated Jan. 9, 2019 (five (5) pages).

\* cited by examiner

ASSEMBLED BATTERY

TECHNICAL FIELD

The present invention relates to assembled batteries each having a plurality of secondary batteries.

BACKGROUND ART

PTL 1 describes "a battery storage unit in which the state of charge of each battery cell is detected by a charge state detection device, and which includes charge state detection terminals provided on the abovementioned conductive connection members, or the electrodes, an insulating holder which exposes at least the charge state detection terminals and covers the conductive connection members from the one side, and further fixes the plurality of battery cells, and a conduction circuit board which has a contact point at a position facing each of the charge state detection terminals and which connects each of the charge state detection terminals and the charge state detection device via this contact point, and further in which the conduction circuit board is fixed to the insulating holder, whereby the charge state detection terminals exposed from the insulating holder and the contact point of the conduction circuit board are connected".

CITATION LIST

Patent Literature

PTL 1: JP2009-059663 A

SUMMARY OF INVENTION

Technical Problem

Electric connection of an assembled battery is constituted by connecting the electrodes of a plurality of single batteries to each other by an electric conductor such as a bus bar having a cross-sectional area enough for obtaining necessary electric power, and in the case of assembled batteries constituted by lithium ion secondary batteries in particular, the assembled battery is provided with a balancing mechanism to monitor the voltage of each single battery for equalizing the voltage, and a circuit board for communication and control by being connected with an external device.

In PTL 1, the circuit board is disposed on the upper surface side of the assembled battery and integrated with the assembled battery, and the circuit board is fixed with screws to an insulating holder (cover plate) that is an insulating member covering conductive connection members of the assembled battery. Therefore, for example, when the insulating holder is deformed by assembling, excessive stress may be generated in electronic components or solder on the circuit board, which may cause breakage of the electronic components themselves or disconnection due to solder peeling.

The present invention has been made in view of the above points. An object thereof is to provide an assembled battery which can relieve the stress acting on the circuit board in the case.

Solution to Problem

In order to solve the above problem, the configurations described in the scope of claims are adopted, for example.

An example of the solution to solve the problems is an assembled battery according to the present invention including: a case which retains a plurality of single batteries arranged side by side and each provided with a positive electrode terminal and a negative electrode terminal on one surface; an insulation cover which covers one surface side of the plurality of single batteries retained in the case; a bus bar which electrically connects the terminals adjacent to each other of the plurality of single batteries and is exposed from the insulation cover; and a circuit board which is fixed to the case and is disposed above the insulation cover, wherein an elastic contact member is attached to a back surface of the circuit board facing the insulation cover so as to be brought into pressure contact with the bus bar by fixing the circuit board to the case, and a support member is provided on the insulation cover or the bus bar so as to be in contact with a front surface of the circuit board on an opposite side of the back surface of the circuit board to support the circuit board.

Advantageous Effects of Invention

According to the present invention, the stress acting on the circuit board in the case can be relaxed. Incidentally, the problems, configurations and effects other than those described above will be clarified from the description of embodiments below.

DESCRIPTION OF EMBODIMENTS

Embodiments of the present invention will be described below with reference to the drawings.

First Embodiment

Figure 1:
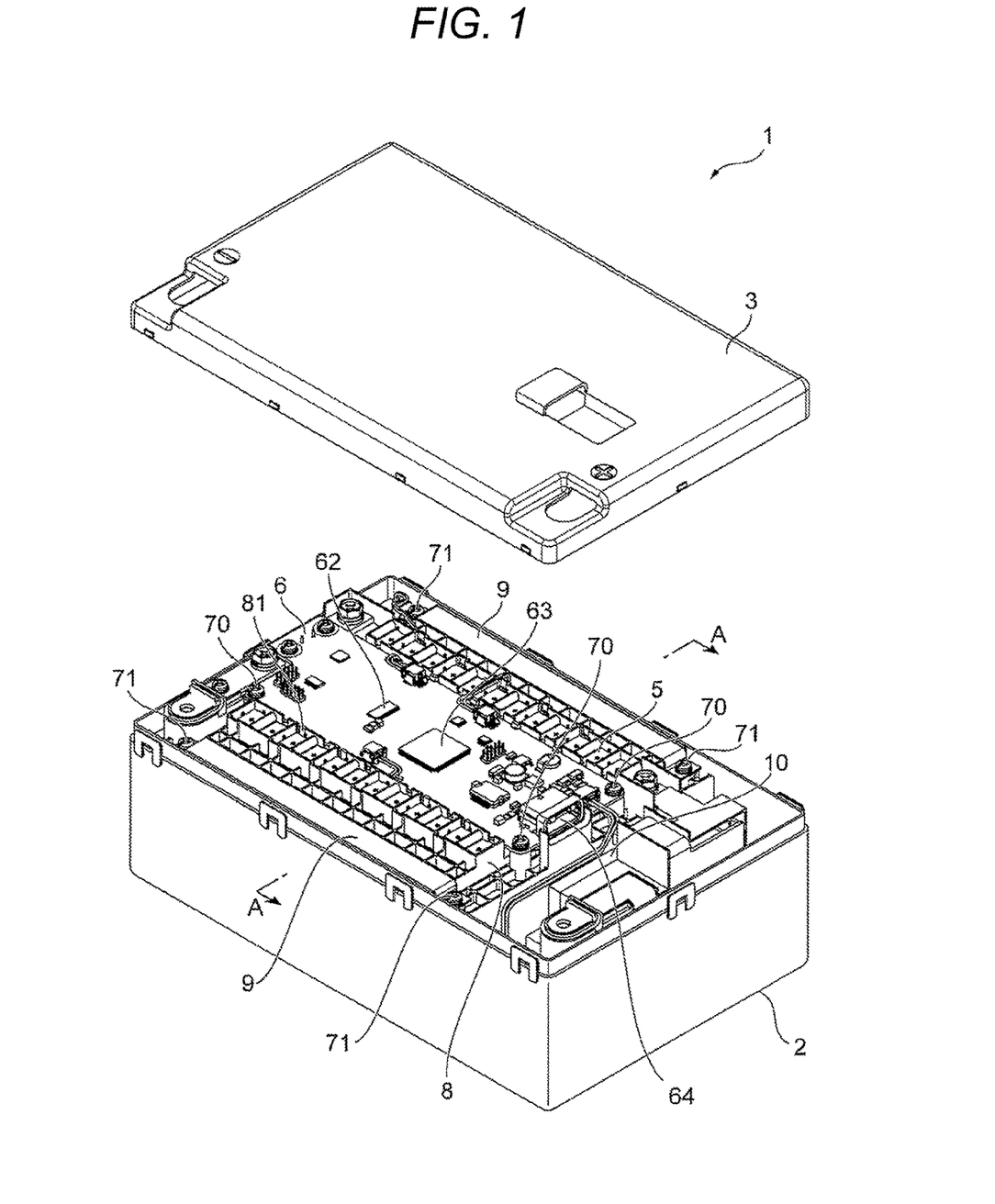
FIG. 1 is an external perspective view of an assembled battery of a first embodiment.
Figure 2:
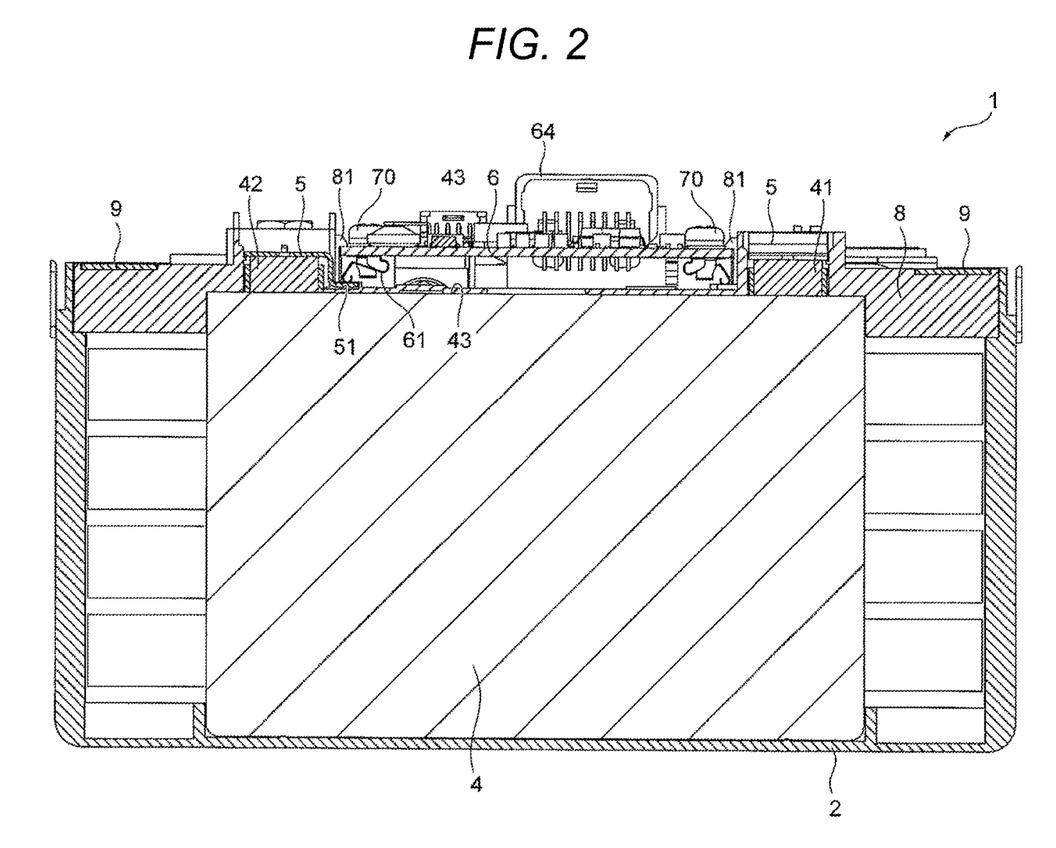
FIG. 2 is a cross-sectional view taken along line A-A in FIG. 1.
Figure 3:
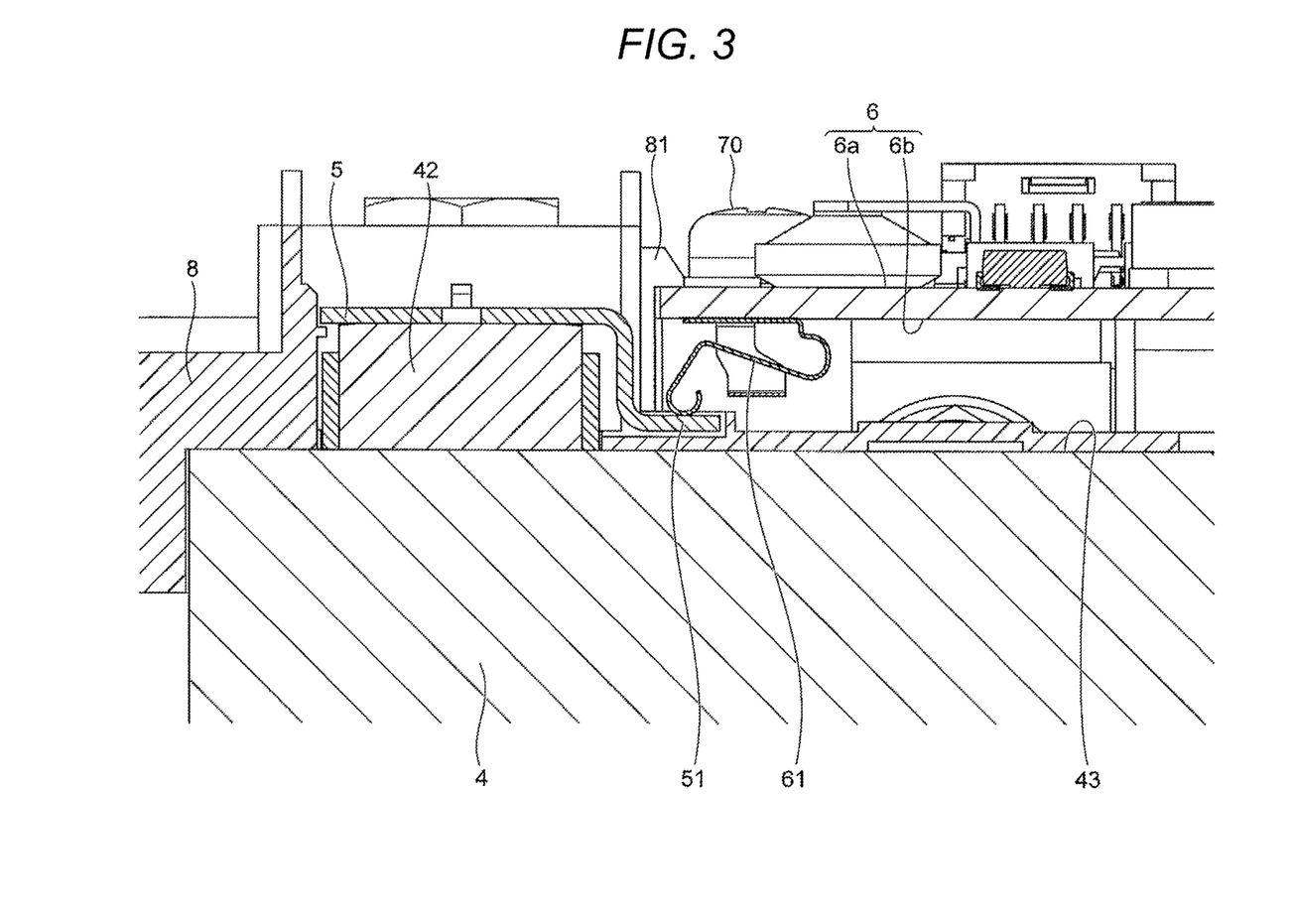
FIG. 3 is a partially enlarged view of FIG. 2.
Figure 4:
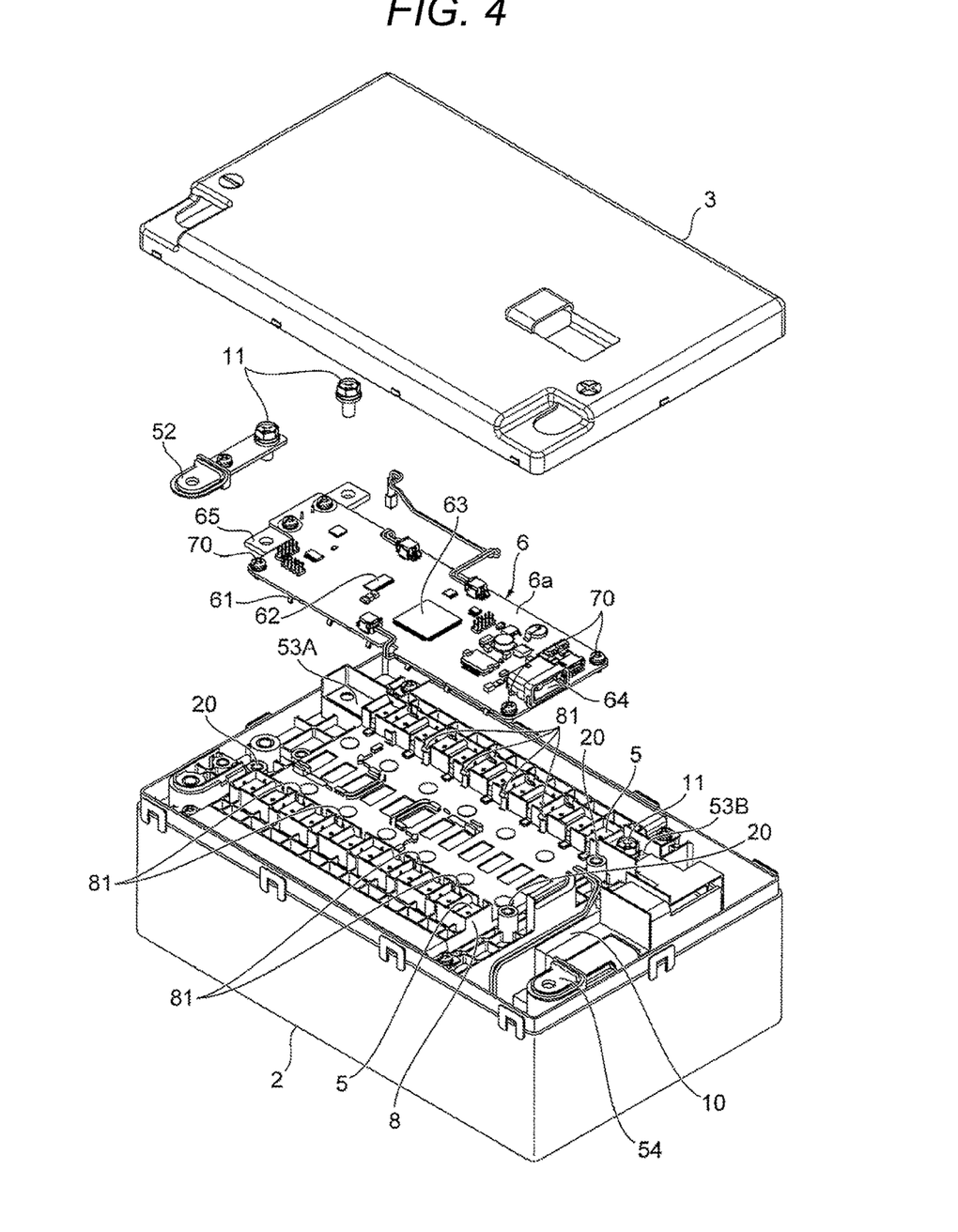
FIG. 4 is an exploded perspective view before the circuit board of FIG. 1 is assembled.
Figure 5:
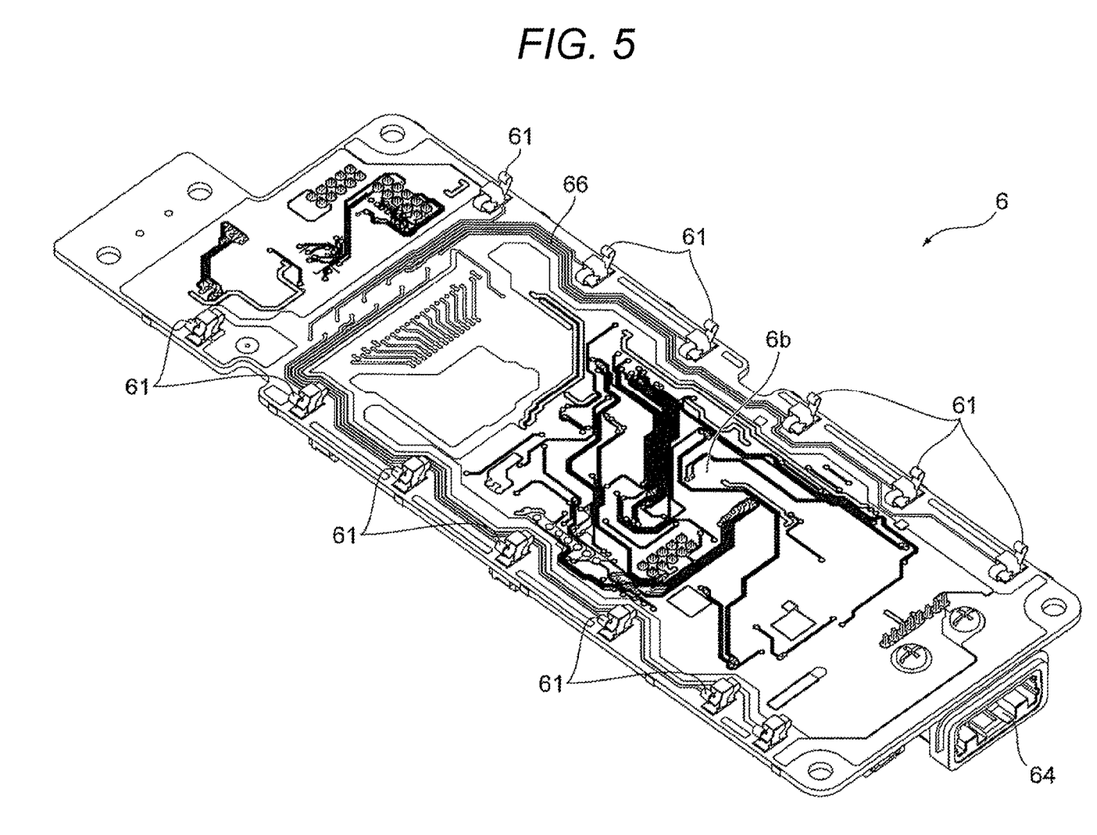
FIG. 5 is an external perspective view of a back surface side of the circuit board.
Figure 6:
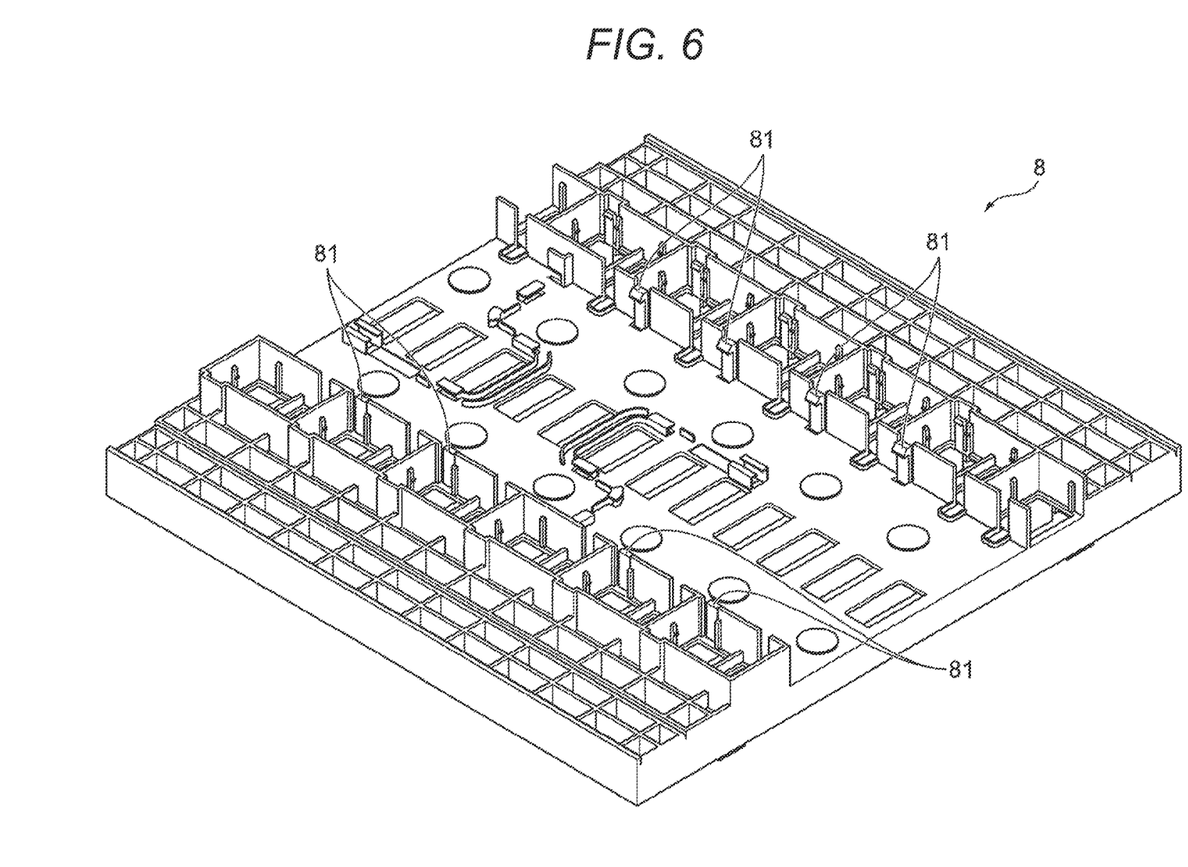
FIG. 6 is an external perspective view of an insulation cover.

FIG. 1 is an external perspective view of an assembled battery of the present embodiment, FIG. 2 is a cross-sectional view taken along line A-A in FIG. 1, FIG. 3 is a partially enlarged view of FIG. 2, FIG. 4 is an external perspective view before the circuit board of FIG. 1 is assembled, FIG. 5 is an external perspective view of the back surface side of the circuit board, and FIG. 6 is a perspective view of the insulation cover.

In a configuration of an assembled battery in which a plurality of single batteries 4 are used as the assembled battery and a circuit board 6 for state monitoring of the single batteries 4 and for the control circuit of the assembled battery is fixed to a case 2 by screws, the assembled battery of the present embodiment has a structure in which elastic contact members 61 are provided on the back surface of the circuit board 6 so as to connect the circuit of the circuit board 6 and bus bars 5 between the single batteries 4 of the assembled battery, and the circuit board 6 is sandwiched between the elastic contact members 61 and claws 81 provided on a front surface 6a side of the circuit board 6.

As shown in FIGS. 1 and 2, an assembled battery 1 includes the case 2 formed of a PBT resin, for example, having insulation properties and a lid 3 to be fitted to the case 2 and formed of a PBT resin, for example, having insulation properties similarly to the case 2, and components such as the plurality of single batteries 4 and the circuit board 6 are assembled in the case 2.

The case 2 has a box shape with the top opened and the bottom closed. The single battery 4 has a rectangular shape, and a positive electrode terminal 41 and a negative electrode terminal 42 are provided on one surface thereof. Then, a plurality of single batteries are arranged in a stacked manner in the longitudinal direction of the case 2 and housed therein. The plurality of single batteries 4 are disposed side by side inside the case 2 so that the positive electrode terminal 41 and the negative electrode terminal 42 of each single battery 4 are arranged on one surface side (an upper surface 43 side of the single battery 4), forming the battery assembly. Then the bus bars 5, which are conductive members made of copper, aluminum or the like, are arranged between adjacent terminals of the plurality of single batteries 4, and are welded and electrically connected to the terminals, respectively.

As shown in FIG. 3, the bus bar 5 is provided with a detection terminal 51. The detection terminal 51 is drawn out from the connection surface with the positive electrode terminal 41 or the negative electrode terminal 42 of the single battery 4 and is disposed along the upper surface of an insulation cover 8 at a position facing a back surface 6b of the board 6 between the positive electrode terminal 41 and the negative electrode terminal 42 of each single battery 4.

The insulation cover 8 is disposed on the upper surface 43 side, which is the one surface side on which the positive electrode terminal 41 and the negative electrode terminal 42 of the single battery 4 are provided. The insulation cover 8 covers the upper surface 43 side of the single battery 4 held in the case 2 and maintains the insulation properties with respect to other components, and is formed of a PP resin, for example, having insulation properties. The insulation cover 8 covers the entire upper surface 43 of the plurality of single batteries 4 arranged in a stacked manner and has a size projecting laterally from the upper surface 43 of the single battery 4. In the insulation cover 8, openings are provided at positions corresponding to the positive electrode terminal 41 and the negative electrode terminal 42 of each single battery 4, so that the bus bar 5 is exposed.

The insulation cover 8 is fixed to the case 2 by fastening plate-shaped metal bands 9 made of stainless steel or steel subjected to corrosion-resistant plating, to the case 2 with screws 71, and maintains the state where the single batteries 4 are housed inside the case 2. On the insulation cover 8, the plurality of claws 81 are provided at substantially regular intervals as support members for supporting the circuit board 6. The claws 81 are disposed to be opposed to the front surface 6a of the circuit board 6 and are in contact with the front surface 6a of the circuit board 6 by the reaction force of the elastic contact members 61. The claws 81 are provided integrally with the insulation cover 8.

The circuit board 6 is arranged above the insulation cover 8. The outer corners of the circuit board 6 are fixed to the case 2 with screws 70. The circuit board 6 is composed of a laminated structure of multilayer copper foil patterns and, for example, insulating resin such as glass epoxy. The circuit board 6 has a plurality of wirings for detecting each of the terminal voltages of the plurality of single batteries 4. On the front surface 6a of the circuit board 6, an element 62 for monitoring the state of the single batteries 4, and a control element 63 for driving of a contactor 10 that conducts an electrical connection and cutoff between an external device (not shown) and the assembled battery 1 and for processing state monitoring information on the single batteries 4, and the like are arranged. The element 62 and the control element 63 are connected to each other by copper foil patterns provided on the front surface 6a or the inner layer of the circuit board 6 to constitute a predetermined electric circuit. A connector 64 for communication with a high-order control circuit (not shown) of the assembled battery 1 is mounted on the circuit board 6 and is connected to an electric circuit of the circuit board 6.

A shunt bus bar 65 which is a plate-shaped conductive member is attached in advance to the circuit board 6, and one end of the shunt bus bar 65 is fixed with the case 2 with a bolt 11 together with a terminal bus bar 53A of a conductive member made of copper, aluminum or the like. The terminal bus bar 53A is welded to the electrode terminal of the single battery 4 at one end in the stacking direction among the single batteries 4 arranged in a stacked manner inside the case 2. Then, the other end of the shunt bus bar 65 is fixed to the case 2 at a position exposed from a hole formed at a corner on the long side of the lid 3, with the bolt 11 together with a terminal bus bar 52 to be fixed to the case 2.

A terminal bus bar 53B connected to the contactor 10 is welded to the electrode terminal of the single battery 4 at the other end in the stacking direction among the single batteries 4 arranged in a stacked manner inside the case 2. The terminal bus bar 53B is fixed to the case 2 with the bolt 11. A bus bar (not shown) is connected to the other connecting portion of the contactor 10 and is connected to a terminal bus bar 54. The terminal bus bar 54 is fixed to the case 2 at a position exposed from the other hole formed at a corner on the long side of the lid 3. Even in the state where the lid 3 of the assembled battery 1 is attached to the case 2, parts of the terminal bus bars 52 and 54 are exposed from holes formed at corners on the long side of the lid 3, and serves as electrical connecting portions with an external device connected with the assembled battery 1.

As shown in FIG. 5, the elastic contact members 61 which are to be brought into pressure contact with the bus bars 5 by fixing the circuit board 6 to the case 2 are attached to the back surface 6b of the circuit board 6 facing the insulation cover 8. The elastic contact member 61 is formed by bending an elastic material such as phosphor bronze for springs. The elastic contact members 61 are provided correspondingly to a plurality of wirings of the circuit board 6 and are electrically connected to the corresponding wirings. The elastic contact members 61 are connected to the circuit of the circuit board 6 for monitoring the state of the single batteries 4 by being brought into contact with the detection terminals 51 of the bus bars 5.

The elastic contact members 61 are mounted on the back surface 6b of the circuit board 6 and are disposed at positions corresponding to the detection terminals 51 of the respective bus bars 5 along the edge of the long side of the circuit board 6. The elastic contact members 61 are connected to the element 62 for monitoring the state of the single batteries 4, the control element 63 for driving the contactor 10 for electrically connecting and disconnecting the external apparatus (not shown) and the assembled battery 1, and for processing the state monitoring information of the single batteries 4, and the connector 64 for communication with the high-order control circuit, which are disposed on the front surface 6a opposite to the mounting surface for the elastic contact members 61 on the circuit board 6, by using copper foil patterns 66 on the surface or inner layer of the circuit board 6.

The circuit board 6 is assembled from the upper surface side of the insulation cover 8 and fixed to the case 2. The fixation to the case 2 is carried out by entwisting the screws 70 into threaded holes 20 of the case 2. The elastic contact members 61 are mounted on the back surface 6b of the circuit board 6 at positions corresponding to the detection terminals 51 of the respective bus bars 5, and are brought into pressure contact with the detection terminals 51 by fixing the circuit board 6 to the case 2 with the screws 70.

The circuit board 6 is urged in the separating direction away from the upper surface of the insulation cover 8 by the elastic force of the elastic contact members 61. Then, the claws 81 of the insulation cover 8 come in contact with the front surface 6a of the circuit board 6, and thereby the movement in the separating direction is regulated, and the distance between the circuit board 6 and the detection terminals 51 is determined. That is, the circuit board 6 is sandwiched between the elastic contact members 61 and the claws 81, whereby the distance between the bus bars 5 and the circuit board 6 is fixed. Therefore, the elastic contact members 61 are connected to the detection terminals 51 while holding an optional load, and can maintain the contact pressure of the contacting portions with the bus bars 5 without using screws or relay terminals.

In the assembled battery 1 having the above configuration, since the circuit board 6 is fixed to the case 2, and the elastic contact members 61 are connected to the detection terminals 51 of the bus bars 5, and further the claws 81 are in contact with the front surface 6a of the circuit board 6, the circuit board 6 is not completely fixed with respect to the insulation cover 8 and is supported so as to be able to relatively move and deform in a direction along the board surface of the circuit board 6 and in the direction perpendicular to the board surface in a state of so-called floating support. Hence, even when the insulation cover 8 is deformed by assembling, or vibration is applied to the insulation cover 8, stress due to the deformation or the vibration can be prevented from acting on the circuit board 6. Therefore, occurrence of breakage of electronic components or disconnection due to peeling of solder on the circuit board 6 can be prevented in advance, and a highly reliable assembled battery can be obtained.

Second Embodiment

Figure 7:
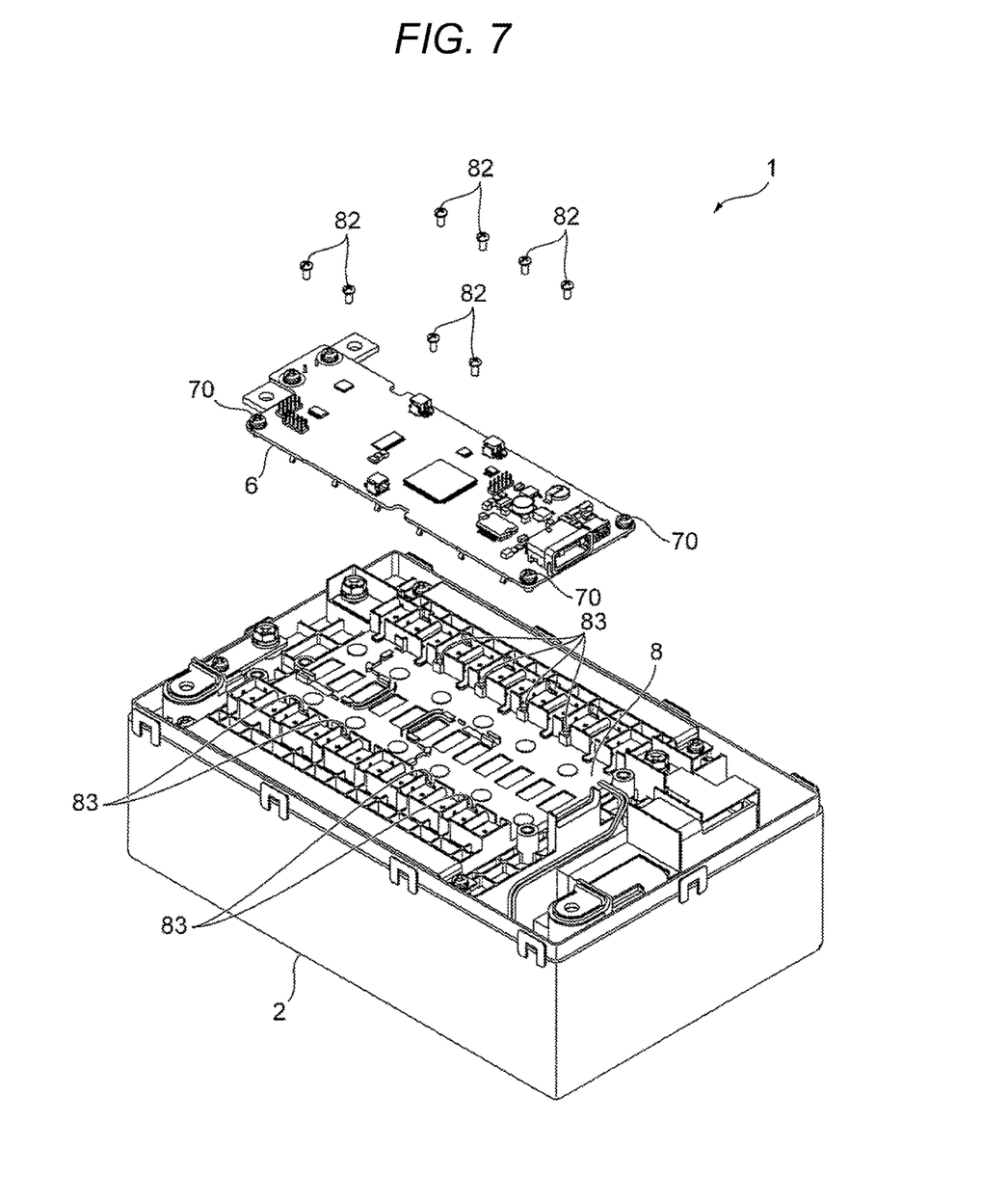
FIG. 7 is an external perspective view of an assembled battery of a second embodiment.
Figure 8:
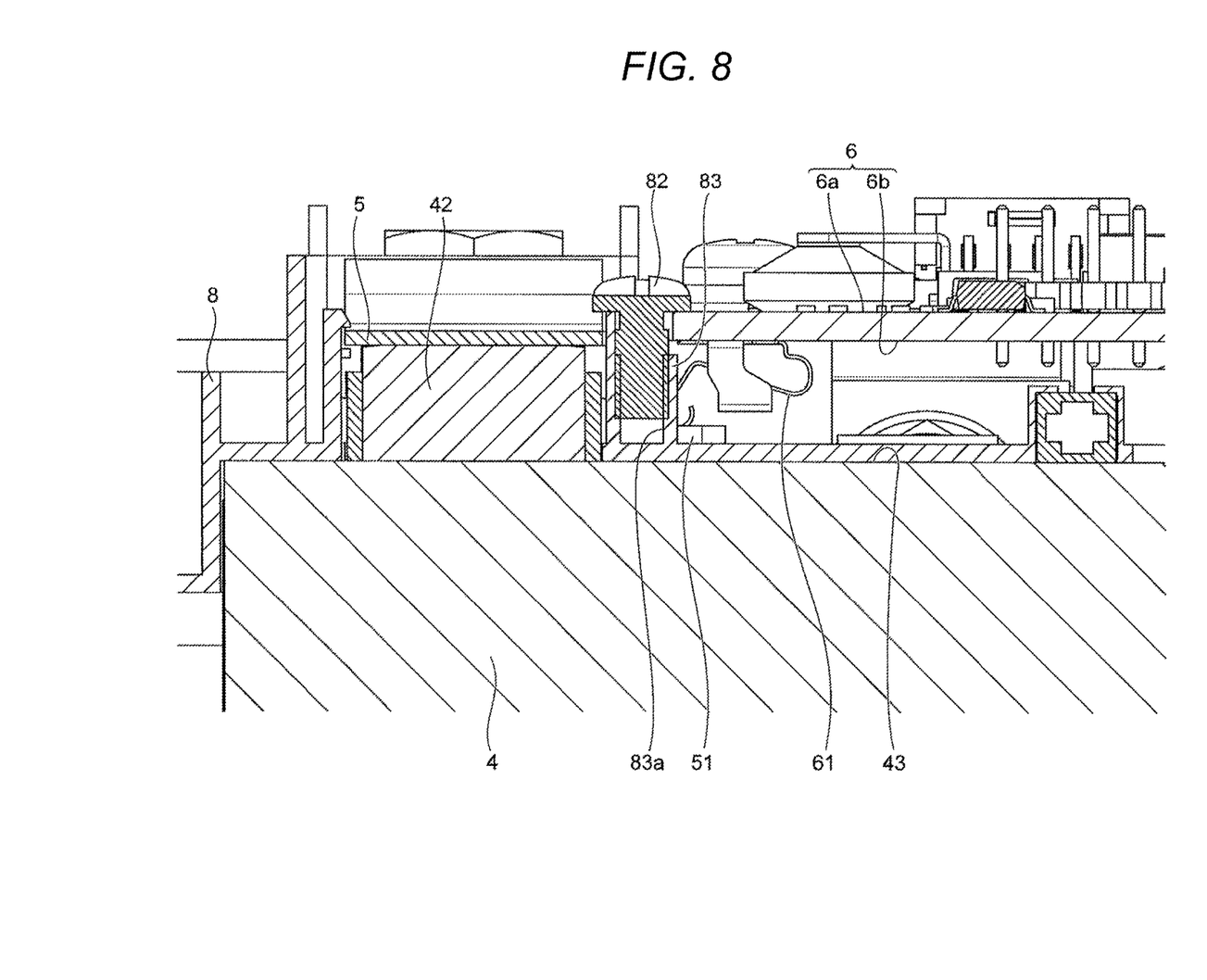
FIG. 8 is a partially enlarged view showing a main part of the assembled battery of the second embodiment by using a cross section.

FIG. 7 is an external perspective view of the assembled battery of the second embodiment, and FIG. 8 is a partially enlarged view showing a main part of the assembled battery of the second embodiment by using a cross section. It should to be noted that the same reference numerals are given to similar constituent elements to those in the first embodiment described above to omit detailed description thereof.

A feature of the present embodiment is that screws 82 are fixed to the insulation cover 8 instead of the claws 81 of the first embodiment and the heads of the fixed screws 82 are brought into contact with the front surface 6a of the circuit board 6. In the insulation cover 8 of the present embodiment, bosses 83 each having a boss hole 83a are formed at the positions of the claws 81 of the first embodiment. The screws 82 are entwisted into the boss holes 83a of the bosses 83, and the head of the screw 82 is brought into contact with the front surface 6a of the circuit board 6. As shown in FIG. 8, a stepped screw may be used for the screw 82, but a tapping screw may also be used.

Since the heads of the screws 82 are brought into contact with the front surface 6a of the circuit board 6, movement of the circuit board 6 in the separating direction away from the upper surface of the insulation cover 8 is restricted and the circuit board 6 is supported at this position. Thus, the circuit board 6 is in the state of floating support in which the circuit board 6 is relatively movable and deformable in a direction along the board surface of the circuit board 6 and in the direction perpendicular to the board surface. Therefore, even if the insulation cover 8 is deformed by assembling or vibration is applied to the insulation cover 8, stress due to the deformation or the vibration can be prevented from acting on the circuit board 6. Accordingly, occurrence of breakage of electronic components and disconnection due to peeling of solder on the circuit board 6 can be prevented in advance, and a highly reliable assembled battery can be obtained.

According to the present embodiment, when the circuit board 6 is set above the upper surface of the insulation cover 8 in the assembling work, it is not necessary to elastically deform the claws 81 as in the first embodiment, and the setting is completed only by placing the circuit board 6 in a predetermined position so that the setting work of the circuit board 6 can be simplified.

Third Embodiment

Figure 9:
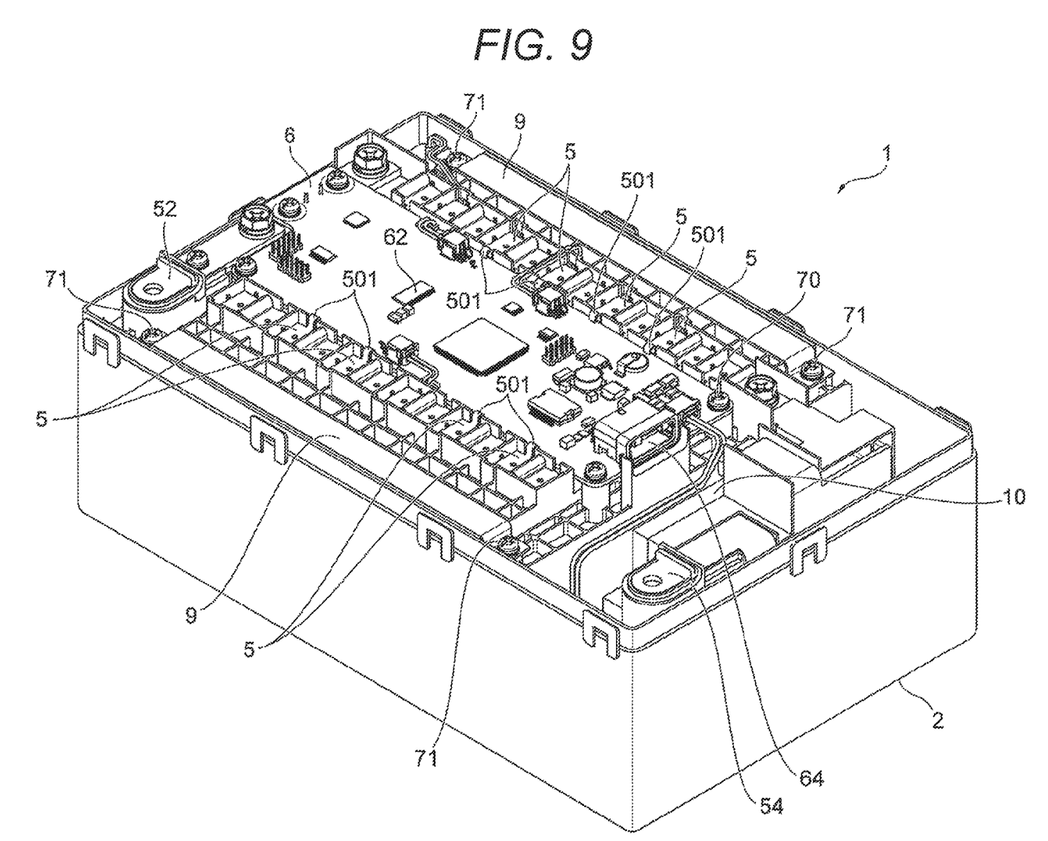
FIG. 9 is an external perspective view of an assembled battery of a third embodiment.
Figure 10:
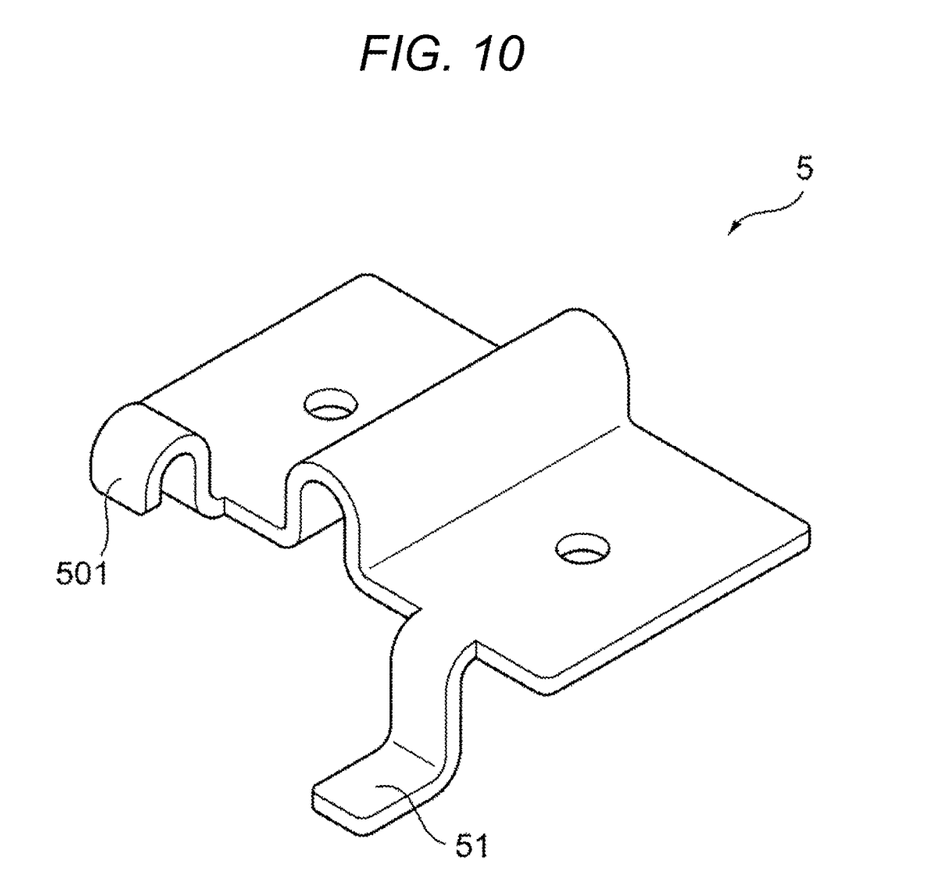
FIG. 10 is an external perspective view of a bus bar of the third embodiment.

FIG. 9 is an external perspective view of the assembled battery of the third embodiment, and FIG. 10 is an external perspective view of the bus bar of the third embodiment. It should be noted that the same reference numerals are given to similar constituent elements to those in the above embodiments, and a detailed description thereof will be omitted.

A feature of the present embodiment is that each bus bar 5 is provided with a protrusion 501 as a support member for supporting the circuit board 6. In the present embodiment, the protrusion 501 is provided on part of the bus bar 5, and the detection terminal 51 is provided separately from the protrusion 501. The circuit board 6 is disposed between the protrusion 501 and the detection terminal 51 of the bus bar 5, and the front surface 6a of the circuit board 6 comes in contact with the tip of the protrusion 501. The tip of the protrusion 501 is subjected to an insulation treatment such as resin coating, and measures for insulation from the circuit board 6 has been carried out.

As the protrusions 501 of the bus bars 5 come in contact with the front surface 6a, the movement of the circuit board 6 in the separating direction away from the upper surface of the insulation cover 8 is restricted and the circuit board 6 is supported at this position. Therefore, a floating support state is made so that the circuit board 6 is relatively movable and deformable in a direction along the board surface of the circuit board 6 and in the direction perpendicular to the board surface. Hence, even when the insulation cover 8 is deformed by assembling, or vibration is applied to the insulation cover 8, stress due to the deformation or the vibration can be prevented from acting on the circuit board 6. Accordingly, occurrence of breakage of electronic components and disconnection due to peeling of solder on the circuit board 6 can be prevented in advance, and a highly reliable assembled battery can be obtained.

According to the present embodiment, there is no need to provide the claws 81 on the insulation cover 8 as in the first embodiment, nor to attach the screws 82 by providing the insulation cover 8 with the bosses 83 as in the second embodiment, the structure can be simplified and the assembly work can be made easier.

Although embodiments of the present invention have been described in detail above, it should be understood that the present invention is not limited to the embodiments described above, and various design changes can be made without departing from the spirit of the present invention described in the scope of claims. For example, the above-described embodiments have been described in detail in order to describe the present invention in an easy-to-understand manner, and are not necessarily limited to those having all the described configurations. In addition, part of a configuration of an embodiment can be replaced by a configuration of another embodiment, and a configuration of an embodiment can be added to a configuration of another embodiment. Furthermore, it is possible to add other configurations, delete some configurations, or replace with other configurations with respect to part of the configurations of each embodiment.

REFERENCE SIGNS LIST 1 assembled battery
2 case
3 lid
4 single battery
5 bus bar
51 detection terminal
6 circuit board
61 elastic contact member
8 insulation cover
9 metal band
10 contactor

The invention claimed is:

1. An assembled battery comprising:
   a case which retains a plurality of single batteries arranged side by side and each provided with a positive electrode terminal and a negative electrode terminal on one surface;
   an insulation cover which covers one surface side of the plurality of single batteries retained in the case;
   a bus bar which electrically connects the terminals adjacent to each other of the plurality of single batteries and is exposed from the insulation cover; and
   a circuit board which is fixed to the case via a gap provided above the insulation cover, wherein
      an elastic contact member is attached to a back surface of the circuit board facing the insulation cover, the elastic contact member being disposed in the gap between the circuit board and the insulation cover and being in pressure contact with the bus bar, and
   a support member is provided on the insulation cover or the bus bar so as to be in contact with a front surface of the circuit board on an opposite side of the back surface of the circuit board to support the circuit board.

2. The assembled battery according to claim 1 wherein the support member has a claw integrally formed with the insulation cover, and the claw is in contact with the front surface of the circuit board.

3. The assembled battery according to claim 1 wherein the support member has a screw fixed to the insulation cover, and a head of the screw is in contact with the front surface of the circuit board.

4. The assembled battery according to claim 1 wherein the support member has a protrusion integrally provided on the bus bar, and the protrusion is in contact with the front surface of the circuit board.

* * * * *